Jan. 13, 1931. T. H. FAWCETT 1,789,227
EQUALIZING GEAR FOR LOCOMOTIVES
Filed June 25, 1929  2 Sheets-Sheet 1
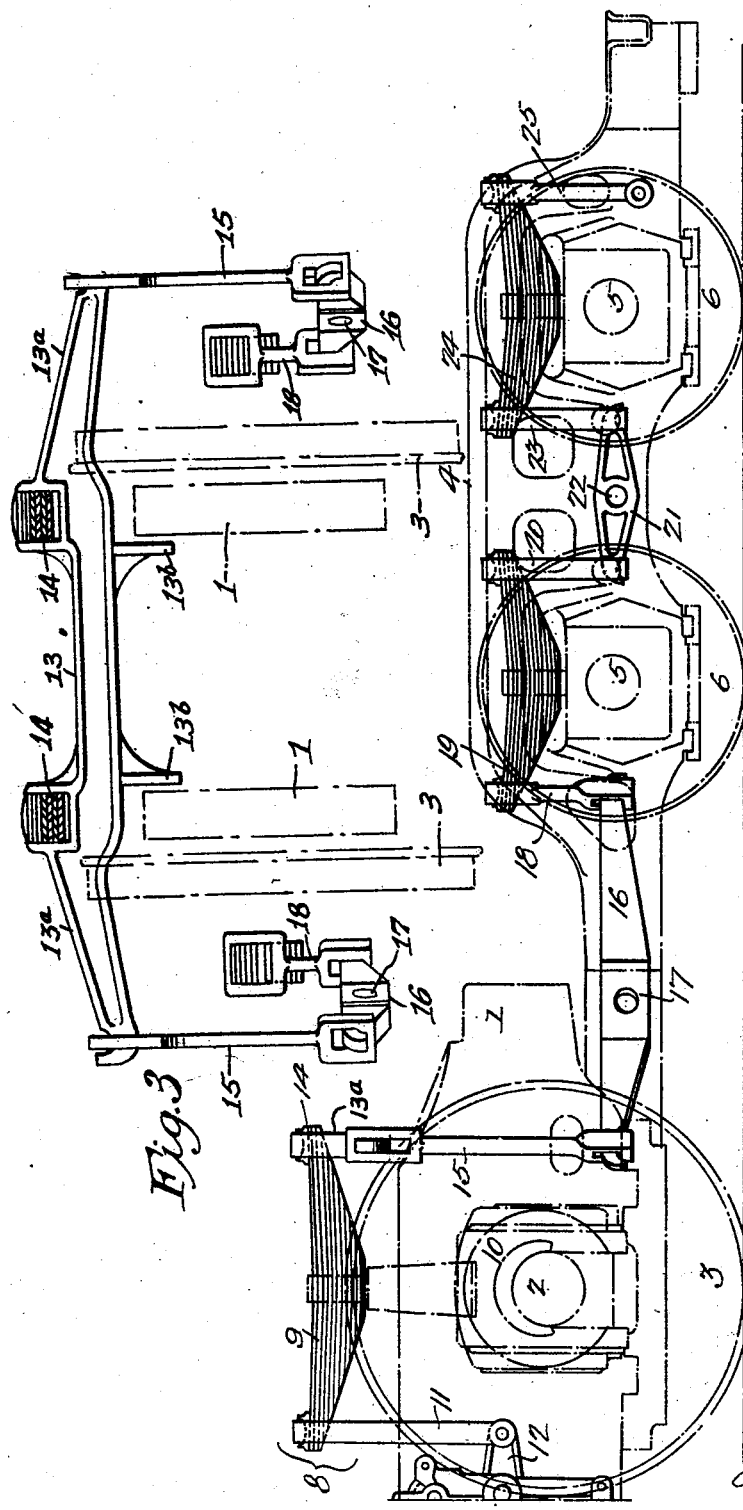

Jan. 13, 1931.  T. H. FAWCETT  1,789,227
EQUALIZING GEAR FOR LOCOMOTIVES
Filed June 25, 1929  2 Sheets-Sheet 2
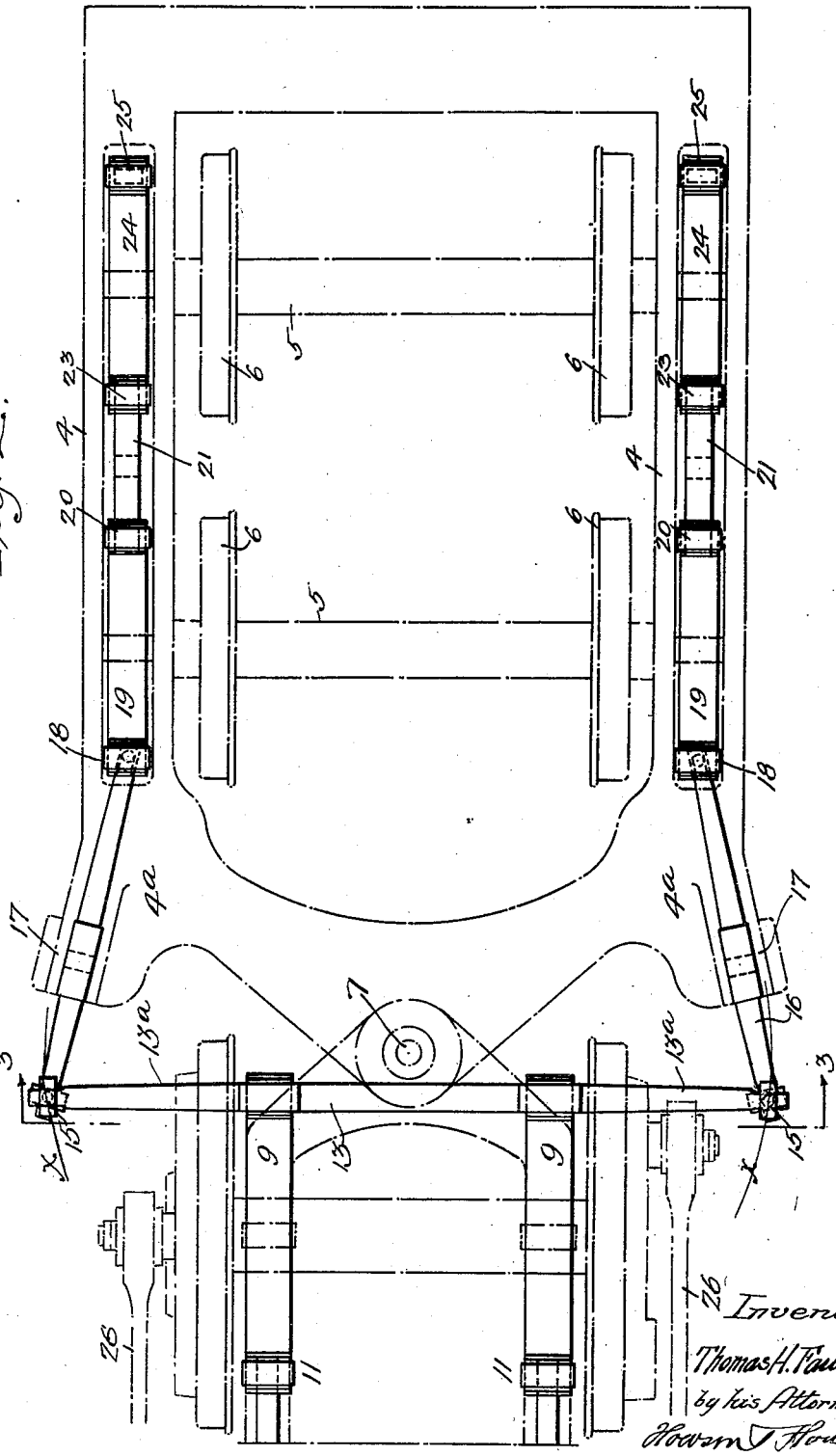

Patented Jan. 13, 1931

1,789,227

UNITED STATES PATENT OFFICE

THOMAS H. FAWCETT, OF PHILADELPHIA, PENNSYLVANIA

EQUALIZING GEAR FOR LOCOMOTIVES

Application filed June 25, 1929. Serial No. 373,668.

This invention relates to the equalizing gear of a locomotive or other vehicle having a rear trailer truck.

One object of the invention is to so construct the equalizing gear that the main spring rigging of the driving wheels can be connected with the spring rigging of the trailer truck so that the wheel base of the locomotive can be materially shortened.
This object is accomplished by locating the trailer equalizing beams outside the lines of the driving wheels of the locomotive. With this construction the forward trailer truck wheels can be placed near the rear driving wheels, thus shortening the total wheel base.

A further object of the invention is to so construct the equalizing gear that greater accessibility can be had for repairs.

And a still further object is to improve the riding of the locomotive. These objects are attained in the following manner, reference being had to the accompanying drawings, in which:

Fig. 1 is a side view of the rear portion of the main frame of a locomotive, and a trailer truck shown by dotted lines and the spring rigging shown in full lines;

Fig. 2 is a plan view showing the main frame and the trailer truck frame in dotted lines and spring rigging in full lines; and Fig. 3 is a sectional view on the line 3—3, Fig. 2.

Referring to the drawings, 1 is the main frame of the locomotive in the present instance. 2 is the rear driving axle. 3 is a rear driving wheel. 4 is a trailer truck frame. 5 are the axles, and 6 are the wheels of the truck. These frames may be of any type desired without departing from the essential features of the invention.

The trailer truck frame is pivotally connected to the main frame of the locomotive by a pivot pin 7. 8 is the equalizing gear on the main frame of the locomotive. The springs 9 are the last springs of the series, each of which bears upon a box 10 of the rear driving axle 2. One end of the spring is connected by a link 11 to an equalizing lever 12, which in turn is connected to the other equalizing mechanisms on the locomotive frame.

The spring 9 on each side of the locomotive frame is connected to the cross equaliz- ing beam 13, the ends of the spring extending into eyes 14 in the beam in the present instance. The ends 13a of this beam extend beyond the line of the main driving wheels of the locomotive as shown in Fig. 2, and links 15 connect the ends of the beam to equalizing beams 16 fulcrumed at 17 on the forward extension 4a of the trailer truck, the fulcrum of the lever being beyond the line of the wheels in the present instance.

The opposite end of each beam 16 is connected by a link 18 to the first equalizing spring 19 on each side of the trailer truck of the locomotive. This spring in the present instance is mounted in the frame 4, and each spring bears upon the box of the forward axle 5. The spring 19 is connected by a link 20 to an equalizing lever on the frame 4, and this lever in turn is connected by a link 23 to the equalizing spring 24 which rests upon the box of the rear axle 5, the opposite end of the spring being connected by a link 25 to the frame of the truck.

The equalizing gear of the trailer truck is of the ordinary type, but the coupling of the equalizing beams 17 to extensions of the cross equalizing beam 13 beyond the line of the wheels is a novel feature of this invention.

The cross equalizing beam 13 has stops 13b which are arranged to come in contact with the main frame of the locomotive. They are so located as to allow a certain amount of free movement of the cross equalizing beam. The lower ends of the links 15 describe the arc x due to the normal swing of the truck in curving.

It will be understood that while I have shown two axles on the truck, the invention can be applied to trucks having more or less than two axles if desired.

It will also be understood that the invention is not limited to a locomotive, but it is applicable where two or more sets of equalizers are connected, and whether the truck is located at front or rear or at both ends of the main frame equalizing system.

I claim:

1. The combination in an equalizing gear for locomotives, of a main frame; an equalizer mounted on each side thereof; a cross equalizing beam located above the main frame; a trailer truck pivoted to the main frame and having equalizing mechanism thereon; and a connection between the equalizing mechanism of the main frame and the equalizing mechanism of the trailer truck, said connection being outside of the line of the wheels of the locomotive.

2. The combination in an equalizing mechanism, of a main equalizing gear; a cross equalizing beam to which the main gear is connected, said cross equalizing beam extending beyond the main equalizing gear at each side; a second equalizing gear; and an equalizing beam connected to the extensions of the cross equalizing beam beyond the first mentioned equalizing gear and to the first member of the second equalizing gear.

3. The combination in a locomotive, of a main frame; equalizing mechanism on said main frame; a trailer truck pivoted to the main frame; an equalizing gear on the trailer truck; a cross equalizing beam hung from the main equalizing gear and extending on each side of the frame beyond the line of the wheels, said trailer truck having extensions beyond the lines of the trailer truck equalizing gear; and equalizing levers pivoted to said extensions, one end of each lever being connected to the ends of the cross equalizing beam, and the other end of the lever being connected to the equalizing gear on the trailer truck.

4. The combination in a locomotive, of a main frame; a rear axle; driving wheels on the axle; a main equalizing gear, the rear springs of which rest upon the boxes of said axles; a cross equalizing beam hung from the springs and extending beyond the line of the wheels and their connected parts; a rear trailer truck pivoted to the main frame; an equalizing gear at each side of the trailer truck, the frame of the trailer truck having lateral extensions located between the wheels of the main frame and those of the trailer truck; equalizing levers arranged at an angle and pivoted to the extensions; and links connecting the ends of the cross equalizing beams with the forward ends of the levers, the rear ends of the levers being connected to an equalizing gear of the trailer truck.

5. The combination in an equalizing gear, of a main frame; equalizing mechanism mounted thereon; a truck; equalizing mechanism on the truck; and a connection between the equalizing mechanism of the main frame and that of the truck, said connection being above the main frame outside of the line of the wheels of the locomotive.

6. The combination of a main frame; an equalizer mounted thereon; a cross equalizing beam extending beyond the main frame; a truck pivoted to the main frame; equalizing mechanism thereon located outside of the lines of the wheels of the said truck; lateral extensions on the truck beyond the lines of the wheels; an equalizing beam fulcrumed on the extensions; connections between said equalizing beams and the cross equalizing beam of the equalizing gear of the main frame; and connections between the beams and the equalizing gear of the truck.

THOMAS H. FAWCETT.